(12) United States Patent
Krishnasamy et al.

(10) Patent No.: US 7,512,653 B2
(45) Date of Patent: Mar. 31, 2009

(54) SYSTEM AND METHOD FOR DYNAMICALLY GROUPING MESSAGING BUDDIES IN AN ELECTRONIC NETWORK

(75) Inventors: Jayakumar Krishnasamy, Sunnyvale, CA (US); Elke Wiggeshoff, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 634 days.

(21) Appl. No.: 10/638,762

(22) Filed: Aug. 11, 2003

(65) Prior Publication Data

US 2005/0038856 A1 Feb. 17, 2005

(51) Int. Cl.
*G06F 15/16* (2006.01)
*G09G 5/00* (2006.01)

(52) U.S. Cl. .............. 709/204; 709/205; 709/206; 709/228; 715/739; 715/751; 715/752; 715/753; 715/758; 707/3

(58) Field of Classification Search .......... 709/206, 709/207, 204, 205, 228; 715/758, 751–753, 715/739; 707/3
See application file for complete search history.

(56) References Cited

U.S. PATENT DOCUMENTS

| | | | |
|---|---|---|---|
| 6,374,237 B1 | 4/2002 | Reese | 707/3 |
| 6,470,332 B1 | 10/2002 | Weschler | 707/3 |
| 7,007,008 B2 * | 2/2006 | Goel et al. | 707/3 |
| 7,124,123 B1 * | 10/2006 | Roskind et al. | 709/205 |
| 7,266,776 B2 * | 9/2007 | Quillen et al. | 715/758 |
| 7,386,798 B1 * | 6/2008 | Heikes et al. | 715/758 |
| 2002/0023132 A1 * | 2/2002 | Tornabene et al. | 709/205 |
| 2002/0130904 A1 * | 9/2002 | Becker et al. | 345/753 |
| 2003/0065721 A1 * | 4/2003 | Roskind | 709/204 |
| 2004/0015553 A1 * | 1/2004 | Griffin et al. | 709/206 |
| 2004/0024822 A1 * | 2/2004 | Werndorfer et al. | 709/206 |
| 2004/0100497 A1 * | 5/2004 | Quillen et al. | 709/206 |
| 2004/0148346 A1 * | 7/2004 | Weaver et al. | 709/204 |
| 2004/0153506 A1 * | 8/2004 | Ito et al. | 709/204 |
| 2004/0186887 A1 * | 9/2004 | Galli et al. | 709/206 |
| 2004/0210639 A1 * | 10/2004 | Ben-Yoseph et al. | 709/206 |
| 2004/0221224 A1 * | 11/2004 | Blattner et al. | 715/500.1 |
| 2004/0243941 A1 * | 12/2004 | Fish | 715/752 |
| 2004/0267625 A1 * | 12/2004 | Feng et al. | 705/26 |
| 2005/0039134 A1 * | 2/2005 | Wiggeshoff et al. | 715/752 |
| 2005/0055450 A1 * | 3/2005 | Gang | 709/228 |
| 2005/0171954 A1 * | 8/2005 | Hull et al. | 707/10 |
| 2005/0227676 A1 * | 10/2005 | DeVries | 455/414.1 |
| 2005/0259802 A1 * | 11/2005 | Gray et al. | 379/201.01 |
| 2006/0095397 A1 * | 5/2006 | Torres et al. | 707/1 |
| 2006/0184515 A1 * | 8/2006 | Goel et al. | 707/3 |

* cited by examiner

*Primary Examiner*—Alina N. Boutah
(74) *Attorney, Agent, or Firm*—Redwood Patent Law; Gregory J. Koerner

(57) ABSTRACT

A system and method for dynamically grouping messaging buddies in an electronic network may include a user device that communicates with a server device in the electronic network for transmitting message information to one or more selected buddy devices in the electronic network. The server device may include a profile database that is configured to store profiles which each include designated profile attributes for a corresponding one of the messaging buddies. A device user may utilize a messaging application of the user device to enter a dynamic grouping mode for generating a dynamic buddy list from a static buddy list based upon a grouping query of the various profiles in the profile database.

38 Claims, 7 Drawing Sheets

Static Buddy List

- Friends

- Friend 1

- Friend 2

- Friend 3

414(a)

- Office

- Officemate 1

- Officemate 2

414(b)

- Family

- Family Member 1

- Family Member 2

Dynamic Buddy List

- Tennis

- Friend 1  *(Friends)*

- Friend 2  *(Friends)*

- Family Member 2  *(Family)*

514(a)

- Surfing

- Officemate 1  *(Office)*

- Friend 2  *(Friends)*

- Family Member 1  *(Family)*

- Friend 3  *(Friends)*

514(b)

- Not Known

- Officemate 1  *(Office)*

Dynamic Buddy List

- Tennis
    - Same County 614
        - Friend 3  *(Friends)*
        - Family Member 2  *(Family)*
    - Different County 618
        - Friend 1  *(Friends)*

514(a)

- Surfing
    - Officemate 1  *(Office)*
    - Friend 2  *(Friends)*
    - Family Member 1  *(Family)*
    - Friend 3  *(Friends)*

514(b)

- Not Known
    - Officemate 1  *(Office)*

SYSTEM AND METHOD FOR DYNAMICALLY GROUPING MESSAGING BUDDIES IN AN ELECTRONIC NETWORK

BACKGROUND SECTION

1. Field of the Invention

This invention relates generally to techniques for managing information in an electronic network, and relates more particularly to a system and method for dynamically grouping messaging buddies in an electronic network.

2. Description of the Background Art

Implementing effective methods for managing information in an electronic network is a significant consideration for designers and manufacturers of contemporary electronic devices. However, effectively managing information utilized by devices in an electronic network may create substantial challenges for system designers. For example, enhanced demands for increased device functionality and performance may require more system processing power and require additional software resources. An increase in processing or software requirements may also result in a corresponding detrimental economic impact due to increased production costs and operational inefficiencies.

Furthermore, enhanced device capability to perform various advanced network operations may provide additional benefits to a system user, but may also place increased demands on the control and management of various communication mechanisms. For example, an enhanced electronic network device that effectively manages communications involving digital image data may frequently benefit from an efficient implementation because of the large amount and complexity of the digital data involved.

Due to growing demands on system resources and substantially increasing data magnitudes, it is apparent that developing new techniques for managing information in an electronic network is a matter of concern for related electronic technologies. Therefore, for all the foregoing reasons, developing effective systems for managing information in an electronic network remains a significant consideration for designers, manufacturers, and users of contemporary electronic systems.

SUMMARY

In accordance with the present invention, a system and method for dynamically grouping messaging buddies in an electronic network is disclosed. In one embodiment, messaging buddies in the electronic network may initially each utilize a corresponding buddy device to create one or more profiles that may include various profile attributes that describe specified characteristics of the corresponding messaging buddies. The messaging buddies may then utilize respective buddy devices to store the foregoing profiles into a profile database associated with a server in the electronic network.

A device user of a user device in the electronic network may utilize a messaging application to log-in to the foregoing server, which may responsively provide a static buddy list to the user device for specifying pre-defined static buddy groups of the messaging buddies in the electronic network. The messaging application may display the static buddy list upon a user interface of the user device.

The device user of the user device may utilize the messaging application to enter a dynamic grouping mode for creating and submitting a grouping query to generate a dynamic buddy list, in accordance with the present invention. The messaging application may access and download designated profiles from the profile database in the server. The messaging application may then analyze individual profile attributes from each of the downloaded profiles in light of specific query attributes from the foregoing grouping query.

The messaging application may then advantageously generate a corresponding dynamic buddy list that effectively regroups the static buddy list into new dynamic buddy groups according to the specifications and requirements of the grouping query. Finally, the messaging application may display the newly-generated dynamic buddy list upon a user interface of the user device for utilization by the device user. The present invention therefore provides an improved system and method for dynamically grouping messaging buddies in an electronic network.

BRIEF DESCRIPTION OF THE DRAWINGS

FIG. 4 is a diagram for one embodiment of a static buddy list;

FIG. 5 is a diagram for one embodiment of a dynamic buddy list, in accordance with the present invention;

FIG. 6 is a diagram for one embodiment of a dynamic buddy list, in accordance with the present invention.

DETAILED DESCRIPTION

The present invention relates to an improvement in electronic information management techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for dynamically grouping messaging buddies in an electronic network, and may include a user device that communicates with a server device in the electronic network for transmitting message information to one or more selected buddy devices in the electronic network. The server device may include a profile database that is configured to store profiles which each include designated profile attributes for a corresponding one of the messaging buddies. A device user may utilize a messaging application of the user device to enter a dynamic grouping mode for generating a dynamic buddy list from a static buddy list based upon a grouping query of the various profiles in the profile database.

Figure 1:
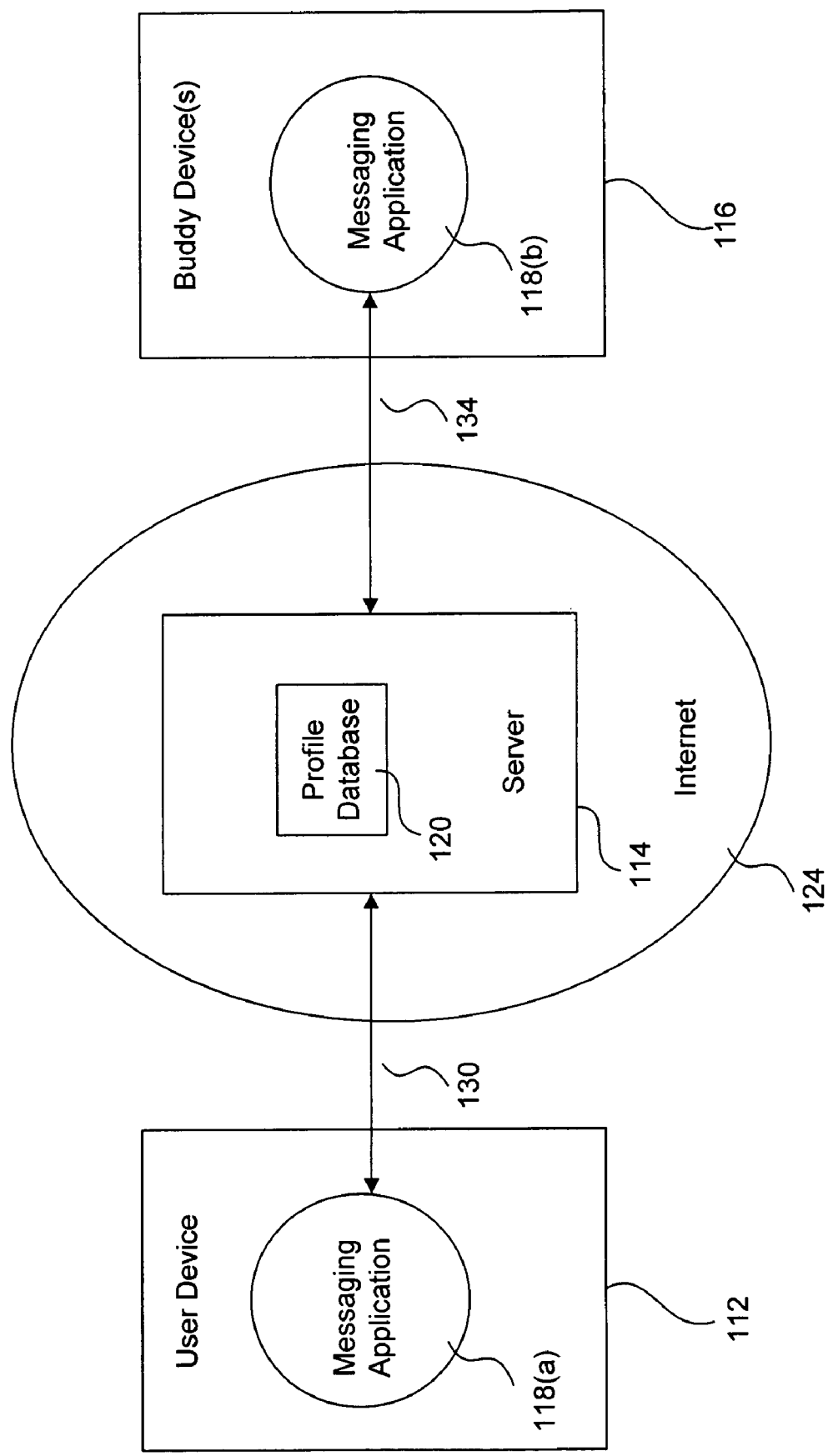
FIG. 1 is a block diagram of an electronic network, in accordance with one embodiment of the present invention.

Referring now to FIG. 1, a block diagram of an electronic network 110 is shown, in accordance with one embodiment of the present invention. In the FIG. 1 embodiment, electronic network 110 may preferably include, but is not limited to, a user device 112, a server 114, one or more buddy device(s) 116, and an Internet 124. In alternate embodiments, electronic network 110 may readily be implemented using various components and configurations in addition to, or instead of, those discussed in conjunction with the FIG. 1 embodiment.

In the FIG. 1 embodiment, user device 112 and buddy device(s) 116 may be implemented as any type of appropriate electronic devices. For example, in certain embodiments, user device 112 and buddy device(s) 116 may be implemented as stationary or portable computer devices. In the FIG. 1 embodiment, user device 112 and buddy device(s) 116 may utilize respective messaging applications 118(a) and 118(b) to communication through Internet 124 and network server 114 via server application 120. For example, user device 112 may communicate with one or more buddy device(s) 116 by utilizing instant messaging techniques that support bi-directional messaging across electronic network 110 via network server 114. In certain embodiments, Internet 124 may be implemented as any other type of electronic network including, but not limited to, an intranet configuration.

In accordance with the present invention, server 114 may include a profile database 120 that contains one or more profiles for each messaging buddy associated with respective buddy devices 116 and for a device user of user device 112. The foregoing profiles may include user profiles that specify various user profile attributes. For example, each user profile may include, but is not limited to, a buddy residence location, one or more buddy hobbies/interests, one or more buddy food preferences, one or more buddy sports interests, a buddy age, a buddy nickname, a buddy email address, a buddy URL, a buddy birthday, a buddy blood type, a buddy nationality, and a buddy description.

In addition, the foregoing profiles may also include service profiles that specify various service profile attributes. For example, the service profiles may indicate various types of content information, such as video or audio content, that corresponding buddies are able to share with other entities over electronic network 110. Each profile may initially be created and stored in profile database 120 when the corresponding buddy creates a new account with server 114. Subsequently, the profiles in profile database 120 may readily be updated whenever appropriate or necessary. In the FIG. 1 embodiment, profile database 120 is shown as part of server 114, however, in alternate embodiments, profile database 120 may be implemented elsewhere in electronic network 110. The implementation and utilization of profile database 120 is further discussed below in conjunction with FIG. 4 through FIG. 7.

Figure 2:
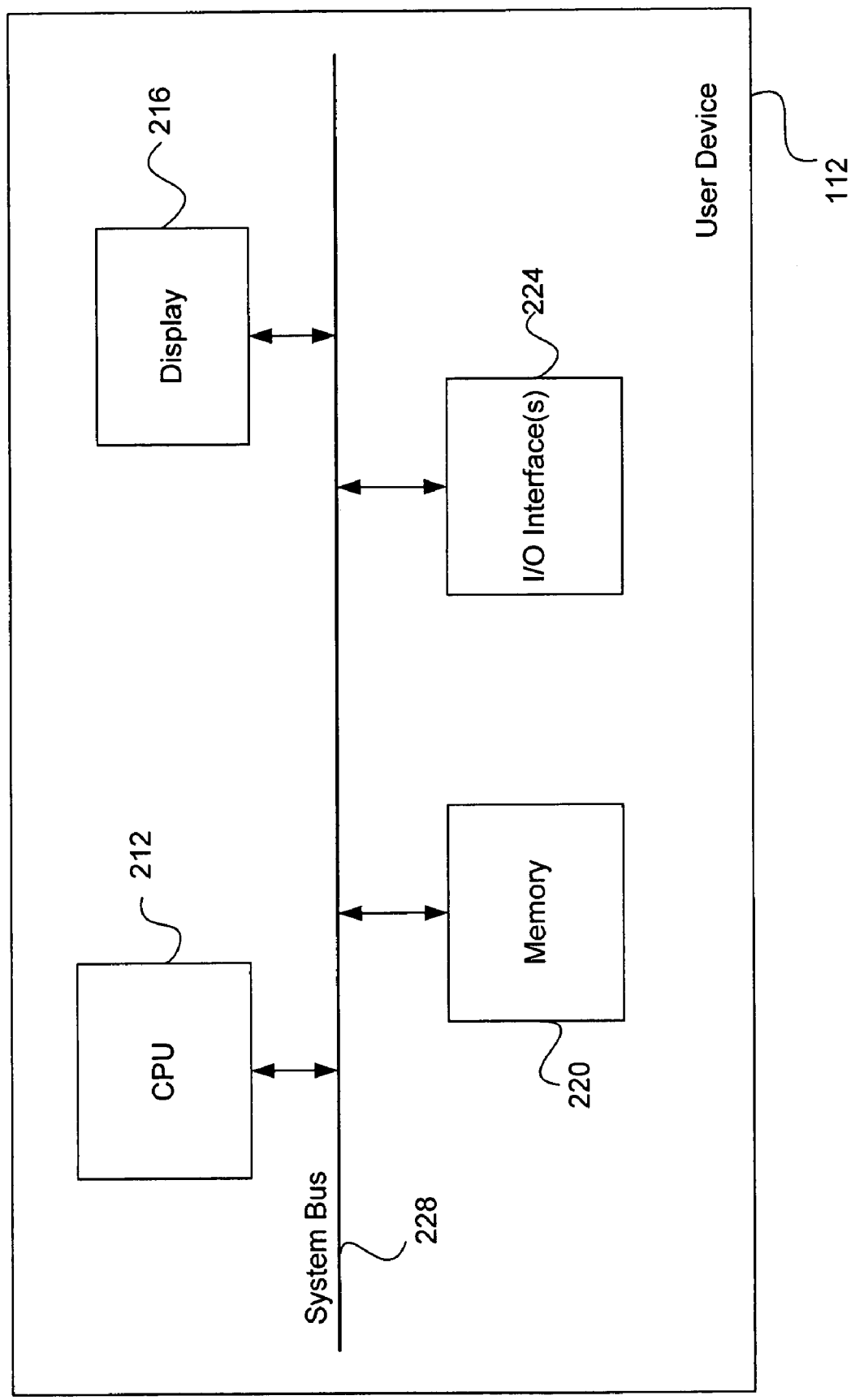
FIG. 2 is a block diagram for one embodiment of the user device of FIG. 1, in accordance with the present invention.

Referring now to FIG. 2, a block diagram for one embodiment of the FIG. 1 user device 112 is shown, in accordance with the present invention. In the FIG. 2 embodiment, user device 112 preferably may include, but is not limited to, a central processing unit (CPU) 212, a display 216, a memory 220, and one or more input/output interface(s) (I/O interface(s)) 224. The foregoing components of user device 112 may preferably be coupled to, and communicate through, a system bus 228. In alternate embodiments, user device 112 may readily be implemented using various components and configurations in addition to, or instead of, those discussed in conjunction with the FIG. 2 embodiment.

In the FIG. 2 embodiment, CPU 212 may be implemented to include any appropriate and compatible microprocessor device that preferably executes software instructions to thereby control and manage the operation of user device 112. The FIG. 2 display 216 preferably may include any effective type of display technology including a cathode-ray-tube monitor or a liquid-crystal display device with an appropriate screen for displaying various information to a device user. In the FIG. 2 embodiment, memory 220 may be implemented to include any combination of desired storage devices, including, but not limited to, read-only memory (ROM), random-access memory (RAM), and various types of non-volatile memory, such as floppy disks or hard disks. The contents and functionality of memory 220 are further discussed below in conjunction with FIG. 3.

In the FIG. 2 embodiment, I/O interface(s) 224 may preferably include one or more input and/or output interfaces to receive and/or transmit any required types of information by user device 112. I/O interface(s) 224 may include one or more means for allowing a device user to communicate with user device 112. For example, the foregoing means may include a keyboard device, a wireless remote control device, a speech-recognition module with corresponding microphone, a graphical user interface with touch-screen capability, or a selection button array mounted externally on user device 112.

The foregoing FIG. 2 embodiment is discussed above in the context of an implementation of user device 112. However, in certain embodiments of electronic network 110, various buddy device(s) 116 may be also be implemented in a manner that is the same or similar to the configuration and functionalities discussed above in conjunction with the FIG. 2 embodiment of user device 112.

Figure 3:
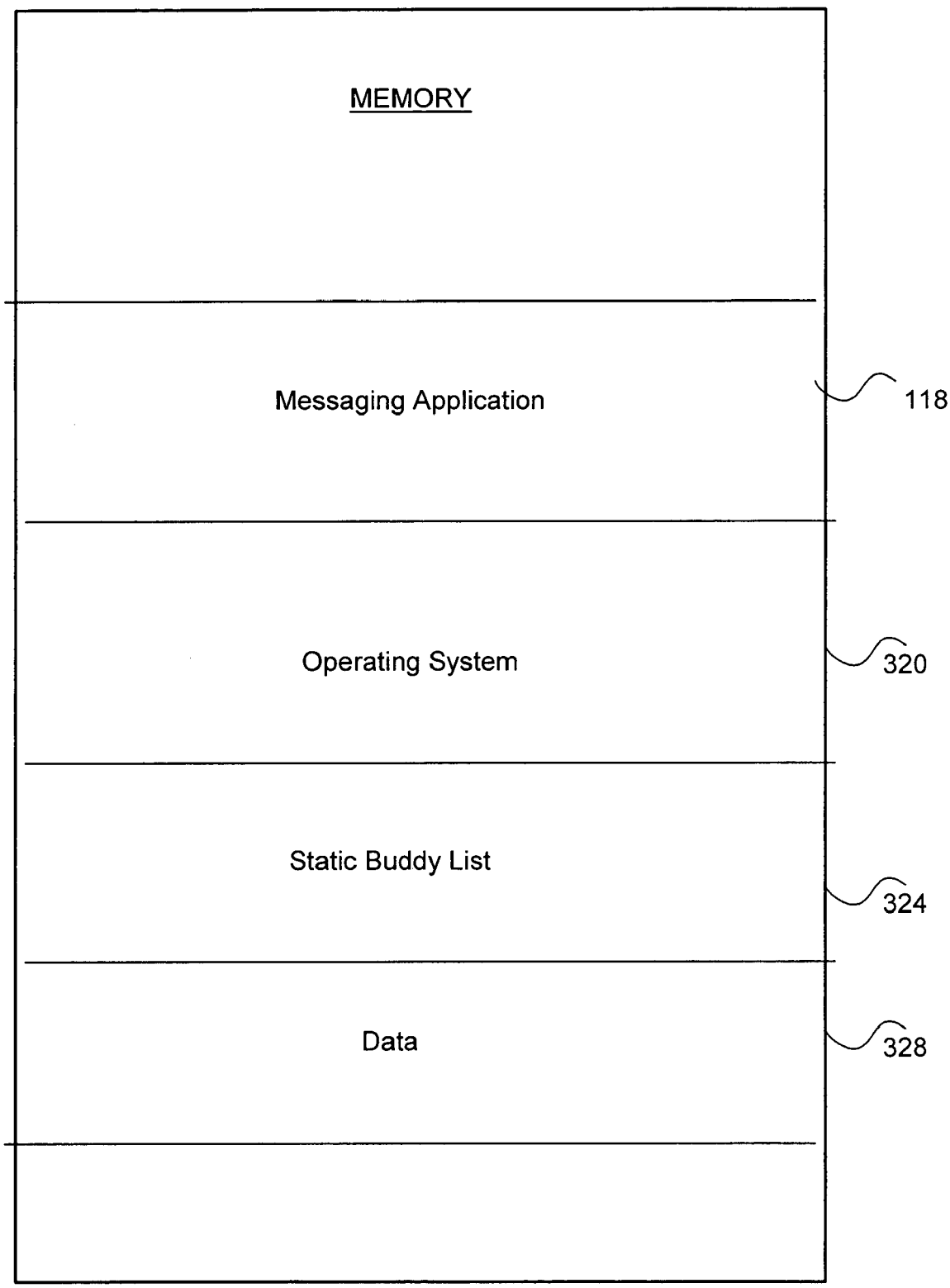
FIG. 3 is a block diagram for one embodiment of the memory of the FIG. 2 user device, in accordance with the present invention.

Referring now to FIG. 3, a block diagram for one embodiment of the FIG. 2 memory 220 is shown, in accordance with the present invention. In the FIG. 3 embodiment, memory 220 preferably includes, but is not limited to, a messaging application 118, an operating system 320, a buddy list 324, and data 328. In alternate embodiments, memory 220 may readily include various other components in addition to, or instead of, those components discussed in conjunction with the FIG. 3 embodiment.

In the FIG. 3 embodiment, messaging application 118 may include program instructions that are preferably executed by CPU 212 (FIG. 2) to perform various functions and operations for user device 112. The particular nature and functionality of messaging application 118 typically varies depending upon factors such as the specific type and particular functionality of the corresponding user device 112. For example, in certain embodiments, messaging application 118 may include appropriate middleware for communicating with server 114 (FIG. 1). In the FIG. 3 embodiment, operating system 320 preferably controls and coordinates low-level functionality of user device 112.

In the FIG. 3 embodiment, static buddy list 324 may include a listing of selected buddy devices 116 (FIG. 1) or other entities that have been specifically designated as communication partners for user device 112. In accordance with the present invention, a messaging buddy may be another individual entity in electronic network 110 with attributes such as name, age, sex, and so on.

In addition, a messaging buddy may also be an electronic online service that may provide services upon request. In this case, the corresponding profile would have data pertaining to the service, such as name of the service, price, bandwidth, and the area where the service is provided. Therefore, a messaging application 118 may categorize buddies (both physical and electronic) into groups where they can be effectively sorted. For example, if a grouping query were "get me the list of buddies who can share live video", and if the physical buddy has a web camera and the electronic buddy were already a movie service, then both of the foregoing buddies could be combined into a group called "who can provide live video". One implementation for static buddy list 324 is further discussed below in conjunction with FIG. 4.

In the FIG. 3 embodiment, data 328 may include any appropriate information for use by user device 112. For example, data 328 may include, but is not limited to, downloaded profile information corresponding to the various profiles stored in profile database 120 (FIG. 1). Data 328 may also temporarily store one or more dynamic buddy lists that are generated by messaging application 118 in response to a dynamic buddy grouping query. Several embodiments for the foregoing dynamic buddy lists are further discussed above in conjunction with FIGS. 5-7.

The foregoing FIG. 3 embodiment is discussed above in the context of an implementation of memory 220 for user device 112. However, in certain embodiments of electronic network 110, memory resources of various buddy device(s) 116 may be also be implemented in a manner that is the same or similar to the configuration and functionalities discussed above in conjunction with the FIG. 2 embodiment.

Referring now to FIG. 4, a diagram for one embodiment of a static buddy list 324 is shown, in accordance with the present invention. In the FIG. 4 embodiment, static buddy list 324 may include, but is not limited to, a first static buddy group 414(a), a second static buddy group 414(b), and a third static buddy group 414(c). The FIG. 4 embodiment of static buddy list 324 is presented for purposes of illustration, and in alternate embodiments, static buddy list 324 may readily include various other elements and functionalities in addition to, or instead of, those elements and functionalities discussed in conjunction with the FIG. 4 embodiment.

In the FIG. 4 example, static buddy group 414(a) is named "Friends" and includes "Friend 1", "Friend 2", and "Friend 3". Similarly, static buddy group 414(b) is named "Office" and includes "Officemate 1" and "Officemate 2". Static buddy group 414(c) is named "Family" and includes "Family Member 1" and "Family Member 2". In other embodiments, static buddy list 324 may be implemented to include any other desired groups which may include any other appropriate buddies from electronic network 110.

In the FIG. 4 embodiment, server 114 (FIG. 1) may maintain a current static buddy list corresponding to user device 112. Whenever a device user of user device 112 performs a log-in procedure to log-in to server 114, then server 114 may responsively provide the static buddy list 324 to user device 112. User device 112 may then display the static buddy list 324 on display 216 of user device 112 for use by the device user. In accordance with the present invention, each buddy listed in static buddy list 324 may advantageously have one or more corresponding profiles stored in profile database 120 of server 114, as previously discussed above in conjunction with FIG. 1.

Referring now to FIG. 5, a diagram for one embodiment of a dynamic buddy list 510(a) is shown, in accordance with the present invention. In the FIG. 5 embodiment, dynamic buddy list 510(a) may include, but is not limited to, a first dynamic buddy group 514(a), a second dynamic buddy group 514(b), and a third dynamic buddy group 514(c).

The dynamic buddy list 510(a) of FIG. 5 illustrates one possible result of a dynamic grouping procedure performed upon the static buddy list 324 shown in FIG. 4. The FIG. 5 embodiment of dynamic buddy list 510(a) is presented for purposes of illustration, and in alternate embodiments, dynamic buddy list 510(a) may readily include various other elements and functionalities in addition to, or instead of, those elements and functionalities discussed in conjunction with the FIG. 5 embodiment.

In accordance with the present invention, a device user of user device 112 may advantageously perform the foregoing dynamic grouping procedure upon a given static buddy list 324 or upon a dynamic buddy list 510 by instructing messaging application 118 (FIG. 3) to enter a dynamic grouping mode for submitting a grouping query to download and examine relevant profile information from profile database 120. In the FIG. 5 embodiment, a grouping query may be formulated by utilizing any appropriate and effective techniques. For example, in certain embodiments, a grouping query may include a query target identifier which specifies some or all of the buddy groups from either static buddy list 324 or a dynamic buddy list 510.

In addition, the grouping query may include, but is not limited to, one or more query attributes that messaging application 118 may utilize for searching profile information from profile database 120. For example, in certain embodiments, messaging application 118 may compare each of the query attributes with the profile attributes in each of the designated query targets. When matching profile attributes are found, then the buddies corresponding to those profiles may be included in a found set that indicates a positive result for the grouping query. All remaining buddies may be placed in a unfound set that indicates a negative result for the grouping query. Messaging application 118 may thus perform the dynamic grouping procedure to generate a dynamic buddy list 510. In certain embodiments, messaging application 118 may automatically select dynamic group names based upon the query attributes from the corresponding grouping query submitted by the device user of user device 112.

In the FIG. 5 example, a device user may enter the dynamic grouping mode to create and submit a grouping query for dynamically grouping static buddy list 324 of FIG. 4 according to respective sports interests. Accordingly, messaging application 118 may access profile database 120 and dynamically group static buddy list 324 into three different groups. In the FIG. 5 example, dynamic buddy group 514(a) is named "Tennis" and includes "Friend 1", "Friend 2", and "Family Member 2". Similarly, dynamic buddy group 514(b) is named "Surfing" and includes "Officemate 1", "Friend 2", "Family Member 1", and "Friend 3". Dynamic buddy group 514(c) is named "Not Known" and includes "Officemate 1".

Where appropriate, a given buddy may be placed in multiple buddy groups in dynamic buddy list 510(a). In the FIG. 5 embodiment, messaging application 118 may also provide a static buddy list indication to show from which static buddy group of static buddy list 324 a given buddy originated. For example, the FIG. 5 dynamic buddy list 510(a) shows the foregoing static buddy list indications in parentheses immediately to the right of each buddy name. In other embodiments, dynamic buddy list 510(a) may alternately be implemented to include any other desired buddy groups which may include any other appropriate buddies from electronic network 110. The generation of dynamic buddy list 510(a) is further discussed below in conjunction with FIG. 7.

Referring now to FIG. 6, a diagram for one embodiment of a dynamic buddy list 510(b) is shown, in accordance with the present invention. In the FIG. 6 embodiment, dynamic buddy list 510(b) may include, but is not limited to, a first dynamic buddy group 514(a), a second dynamic buddy group 514(b), and a third dynamic buddy group 514(c). The dynamic buddy list 510(b) of FIG. 6 illustrates one possible result of a dynamic sub-grouping procedure performed upon the dynamic buddy list 510(a) shown in FIG. 5.

The FIG. 6 embodiment of dynamic buddy list 510(b) is presented for purposes of illustration, and in alternate embodiments, dynamic buddy list 510(b) may readily include various other elements and functionalities in addition to, or instead of, those elements and functionalities discussed in conjunction with the FIG. 6 embodiment.

In accordance with the present invention, a device user of user device 112 may advantageously perform the foregoing dynamic sub-grouping procedure upon a given a dynamic buddy list 510 by instructing messaging application 118 (FIG. 3) to enter a dynamic sub-grouping mode for submitting a sub-grouping query to examine relevant profile information from profile database 120. In the FIG. 6 embodiment, a sub-grouping query may be formulated by utilizing any appropriate and effective techniques. For example, in certain embodiments, a sub-grouping query may include a query target identifier which specifies some of the buddy groups from a dynamic buddy list 510.

In addition, the sub-grouping query may include, but is not limited to, one or more query attributes that messaging application 118 may utilize for searching profile information from profile database 120. For example, in certain embodiments, messaging application 118 may compare each of the query attributes with the profile attributes in each of the designated query targets. When matching profile attributes are found, then the buddies corresponding to those profiles may be included in a found set that indicates a positive result for the sub-grouping query. All remaining buddies may be placed in a unfound set that indicates a negative result for the sub-grouping query. Messaging application 118 may thus perform the dynamic sub-grouping procedure to generate a dynamic buddy list 510(b) that includes sub-groups that are nested within a pre-existing dynamic buddy group. In certain embodiments, messaging application 118 may automatically select dynamic sub-group names based upon the query attributes from the corresponding sub-grouping query submitted by the device user of user device 112.

In the FIG. 6 example, a device user may enter the dynamic sub-grouping mode to create and submit a sub-grouping query for dynamically sub-grouping buddy group 514(a) of dynamic buddy list 510(a) of FIG. 5 according to respective geographical locations. Accordingly, messaging application 118 may access profile database 120 and dynamically sub-group buddy group 514(a) of dynamic buddy list 510(a) into two different groups. In the FIG. 6 example, dynamic buddy sub-group 614 is named "Same County" and includes "Friend 3", and "Family Member 2". Similarly, dynamic buddy sub-group 618 is named "Different County" and includes only "Friend 1".

In the FIG. 6 embodiment, messaging application 118 may also provide a static buddy list indication to show from which static buddy group of static buddy list 324 a given buddy originated. For example, the FIG. 6 dynamic buddy list 510 (b) shows the foregoing static buddy list indications in parentheses immediately to the right of each buddy name. In other embodiments, dynamic buddy list 510(b) may alternately be implemented to include any other desired buddy groups which may include any other appropriate buddies from electronic network 110.

Figure 7:
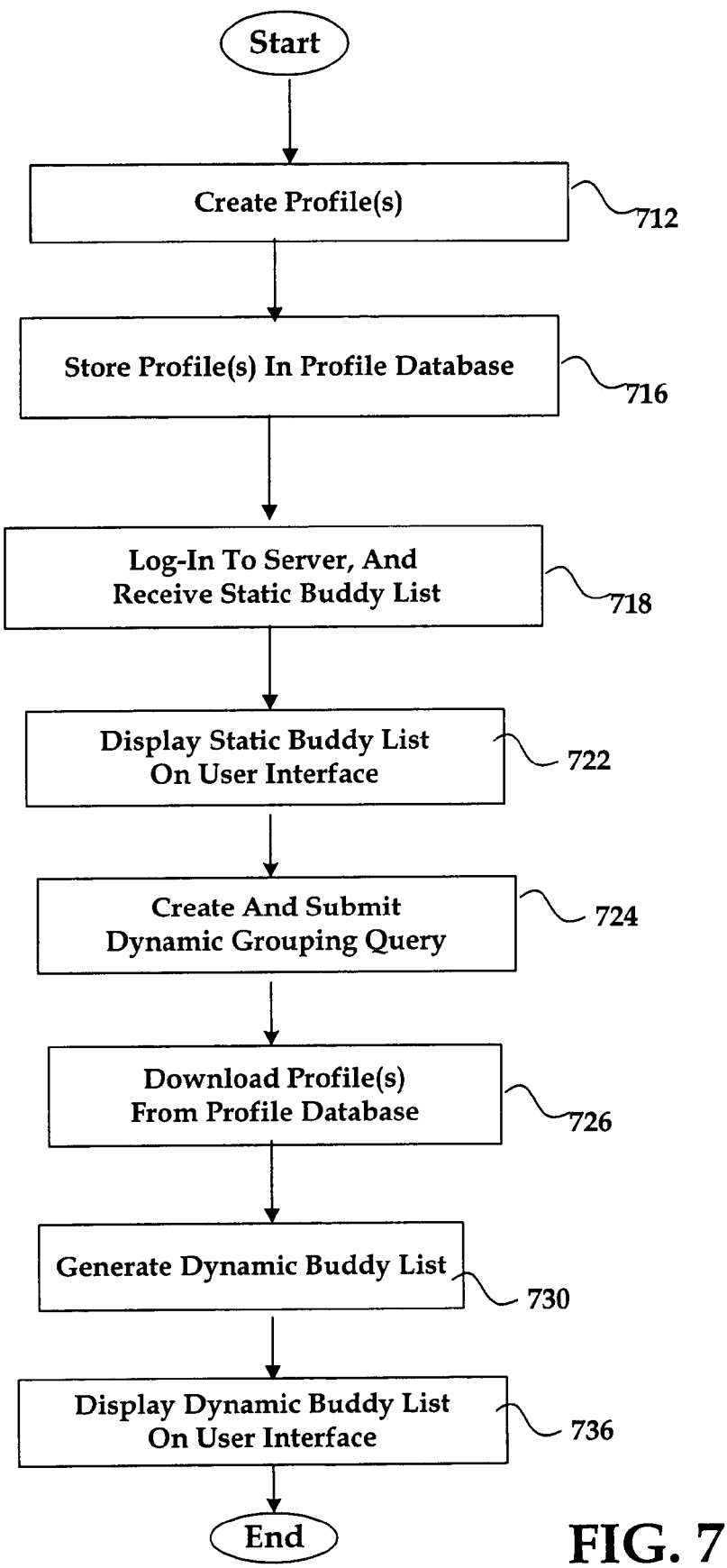
FIG. 7 is a flowchart of method steps for performing a dynamic grouping procedure, in accordance with one embodiment of the present invention.

Referring now to FIG. 7, a flowchart of method steps for dynamically grouping messaging buddies in an electronic network 110 is shown, in accordance with one embodiment of the present invention. The FIG. 7 embodiment is presented for purposes of illustration, and in alternate embodiments, the present invention may readily utilize various other steps and sequences than those discussed in conjunction with the FIG. 7 embodiment.

In the FIG. 7 embodiment, in step 712, messaging buddies in an electronic network 110 may initially each utilize a corresponding buddy device 116 to create one or more profiles that may include various profile attributes that describe specified characteristics of the corresponding messaging buddies. In step 716, the messaging buddies may then utilize respective buddy devices 116 to store the foregoing profiles into a profile database 120 of a server 114 in electronic network 110.

In step 718, a device user of a user device 112 in electronic network 110 may utilize a messaging application 118 to log-in to the server 114. Server 114 may responsively provide a static buddy list 324 to user device 112 to specify static buddy groups of the messaging buddies in electronic network 110. In step 722, messaging application 118 may display the static buddy list 324 upon a user interface of user device 112. In step 724, the device user of user device 112 may enter a dynamic grouping mode to create and submit a grouping query for generating a dynamic buddy list 510, in accordance with the present invention.

In step 726, messaging application 118 may access and download designated profiles from the profile database 120 of server 114. In step 730, messaging application 118 may then analyze individual profile attributes from each of the downloaded profiles in light of specific query attributes from the foregoing grouping query. Messaging application 118 may then advantageously generate a corresponding dynamic buddy list 510 that effectively regroups static buddy list 324 into new dynamic buddy groups according to the specifications and requirements of the grouping query. Finally, in step 736, messaging application 118 may display the dynamic buddy list 510 upon a user interface of user device 112 for utilization by the device user. The FIG. 7 process may then terminate.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for dynamically grouping messaging buddies from an electronic network, comprising:

a profile database configured to store profiles that each include profile attributes of one of said messaging buddies;

a messaging application of a user device coupled to said electronic network for transmitting message information to buddy devices corresponding to said messaging buddies, said messaging application entering a dynamic grouping mode, said messaging application generating a dynamic buddy list based upon comparing a grouping query to said profiles in said profile database, said grouping query being from a device user of said user device, said dynamic buddy list including target buddies that form a subset of messaging buddies from a static buddy list, said profile database being implemented as part of a server which coordinates communications between said user device and said buddy devices over said electronic network, said device user of said user device instructing said messaging application to enter said dynamic grouping mode by utilizing a user interface of said user device, said device user of said user device utilizing said messaging application and said user interface to create and submit said grouping query for generating said dynamic buddy list, said grouping query including a query target identifier which specifies buddy groups from said static buddy list to which said grouping query is directed; and a processor device coupled to said user device for controlling said messaging application to thereby dynamically group said messaging buddies from said electronic network.

2. The system of claim 1 wherein said messaging buddies in said electronic network initially each utilize a corresponding one of said buddy devices to create one or more of said profiles that include said profile attributes that describe specified characteristics of corresponding ones of said messaging buddies.

3. The system of claim 2 wherein said profile attributes include a buddy residence location, one or more buddy interests, one or more buddy food preferences, one or more buddy sports interests, a buddy birthday, a buddy nationality, one or more buddy services, and a buddy description.

4. The system of claim 2 wherein said messaging buddies each utilize said corresponding one of said buddy devices to store said one or more of said profiles into said profile database of said server.

5. The system of claim 1 wherein said device user of said user device utilizes said messaging application to log-in to said server of said electronic network.

6. The system of claim 5 wherein said server provides said static buddy list to said user device to specify static buddy groups of said messaging buddies in said electronic network.

7. The system of claim 6 wherein said messaging application displays said static buddy list upon a user interface of said user device.

8. The system of claim 1 wherein said grouping query includes one or more query attributes that said messaging application utilizes for matching with said profile attributes of said profiles from said profile database.

9. The system of claim 1 wherein said messaging application performs a dynamic grouping procedure by analyzing profile attributes of designated ones of said profiles from said profile database to dynamically regroup said static buddy list into said dynamic buddy list.

10. The system of claim 9 wherein said messaging application automatically generates new dynamic group names for said dynamic buddy list based upon query attributes from said grouping query.

11. The system of claim 9 wherein said messaging application compares query attributes of said grouping query against said profile attributes of said profiles to determine matching characteristics of selected ones of said messaging buddies.

12. The system of claim 11 wherein said messaging application groups one or more of said messaging buddies into a found set that indicates a positive result for said grouping query where said matching characteristics are found, remaining ones of said messaging buddies being placed into an unfound set that indicates a negative result for said grouping query.

13. The system of claim 9 wherein said messaging application displays said dynamic buddy list upon said user interface of said user device for viewing by said device user.

14. The system of claim 13 wherein said device user utilizes said messaging application and said dynamic buddy list to transmit said message information to one or more of said buddy devices corresponding to one or more of said messaging buddies on said dynamic buddy list.

15. The system of claim 1 wherein said messaging application provides static buddy list indications in said dynamic buddy list to show from which static buddy groups of said static buddy list said messaging buddies of said dynamic buddy list originated, said static buddy indications being listed individually for each of said messaging buddies on said dynamic buddy list.

16. The system of claim 1 wherein said device user of said user device utilizes said messaging application to perform a dynamic sub-grouping procedure upon said dynamic buddy list by entering a dynamic sub-grouping mode for submitting a sub-grouping query to examine specified target profiles from said profile database for regenerating said dynamic buddy list to include sub-groups that are nested within a pre-existing dynamic buddy group.

17. A method for dynamically grouping messaging buddies in an electronic network, comprising the steps of:
providing a profile database that is configured to store profiles that each include profile attributes of one of said messaging buddies;
transmitting message information to buddy devices corresponding to said messaging buddies by utilizing a messaging application of a user device coupled to said electronic network, said messaging application entering a dynamic grouping mode, said messaging application generating a dynamic buddy list based upon comparing a grouping query to said profiles in said profile database, said grouping query being from a device user of said user device, said dynamic buddy list including target buddies that form a subset of messaging buddies from a static buddy list, said profile database being implemented as part of a server which coordinates communications between said user device and said buddy devices over said electronic network, said device user of said user device instructing said messaging application to enter said dynamic grouping mode by utilizing a user interface of said user device, said device user of said user device utilizing said messaging application and said user interface to create and submit said grouping query for generating said dynamic buddy list, said grouping query including a query target identifier which specifies buddy groups from said static buddy list to which said grouping query is directed; and
controlling said messaging application with a processor device coupled to said user device to thereby dynamically group said messaging buddies from said electronic network.

18. The method of claim 17 wherein said messaging buddies in said electronic network initially each utilize a corresponding one of said buddy devices to create one or more of said profiles that include said profile attributes that describe specified characteristics of corresponding ones of said messaging buddies.

19. The method of claim 18 wherein said profile attributes include a buddy residence location, one or more buddy interests, one or more buddy food preferences, one or more buddy sports interests, a buddy birthday, a buddy nationality, one or more buddy services, and a buddy description.

20. The method of claim 18 wherein said messaging buddies each utilize said corresponding one of said buddy devices to store said one or more of said profiles into said profile database of said server.

21. The method of claim 17 wherein said device user of said user device utilizes said messaging application to log-in to said server of said electronic network.

22. The method of claim 21 wherein said server provides said static buddy list to said user device to specify static buddy groups of said messaging buddies in said electronic network.

23. The method of claim 22 wherein said messaging application displays said static buddy list upon a user interface of said user device.

24. The method of claim 17 wherein said grouping query includes one or more query attributes that said messaging application utilizes for matching with said profile attributes of said profiles from said profile database.

25. The method of claim 17 wherein said messaging application performs a dynamic grouping procedure by analyzing profile attributes of designated ones of said profiles from said profile database to dynamically regroup said static buddy list into said dynamic buddy list.

26. The method of claim 25 wherein said messaging application automatically generates new dynamic group names for said dynamic buddy list based upon query attributes from said grouping query.

27. The method of claim 25 wherein said messaging application compares query attributes of said grouping query against said profile attributes of said profiles to determine matching characteristics of selected ones of said messaging buddies.

28. The method of claim 27 wherein said messaging application groups one or more of said messaging buddies into a found set that indicates a positive result for said grouping query where said matching characteristics are found, remaining ones of said messaging buddies being placed into an unfound set that indicates a negative result for said grouping query.

29. The method of claim 25 wherein said messaging application displays said dynamic buddy list upon said user interface of said user device for viewing by said device user.

30. The method of claim 29 wherein said device user utilizes said messaging application and said dynamic buddy list to transmit said message information to one or more of said buddy devices corresponding to one or more of said messaging buddies on said dynamic buddy list.

31. The method of claim 17 wherein said messaging application provides static buddy list indications in said dynamic buddy list to show from which static buddy groups of said static buddy list said messaging buddies of said dynamic buddy list originated, said static buddy indications being listed individually for each of said messaging buddies on said dynamic buddy list.

32. The method of claim 17 wherein said device user of said user device utilizes said messaging application to perform a dynamic sub-grouping procedure upon said dynamic buddy list by entering a dynamic sub-grouping mode for submitting a sub-grouping query to examine specified target profiles from said profile database for regenerating said dynamic buddy list to include sub-groups that are nested within a pre-existing dynamic buddy group.

33. The method of claim 17 wherein said buddy devices and said user device are implemented as portable electronic devices.

34. The method of claim 17 wherein said static buddy list and said dynamic buddy list are separate entities.

35. The method of claim 17 wherein said dynamic buddy list includes only query results from said grouping query.

36. The method of claim 17 wherein at least one of said messaging buddies on said static buddy list is an electronic online service that is configured to provide online services upon request.

37. The method of claim 17 wherein said device user formulates said grouping query with one or more query terms that are not listed in said profile attributes of said device user.

38. A device for dynamically grouping messaging buddies from an electronic network, comprising:

a messaging application of a user device coupled to said electronic network for transmitting message information to buddy devices corresponding to said messaging buddies, said messaging application entering a dynamic grouping mode, said messaging application generating a dynamic buddy list based upon comparing a grouping query to profiles stored in a profile database, each of said profiles including profile attributes of one of said messaging buddies, said grouping query being from a device user of said user device, said dynamic buddy list including target buddies that form a subset of messaging buddies from a static buddy list, said profile database being implemented as part of a server which coordinates communications between said user device and said buddy devices over said electronic network, said device user of said user device instructing said messaging application to enter said dynamic grouping mode by utilizing a user interface of said user device, said device user of said user device utilizing said messaging application and said user interface to create and submit said grouping query for generating said dynamic buddy list, said grouping query including a query target identifier which specifies buddy groups from said static buddy list to which said grouping query is directed; and a processor device of said user device for controlling said messaging application to thereby dynamically group said messaging buddies from said electronic network.

* * * * *